Sept. 18, 1923.　　　　　　　　　　　　　　　1,468,046
S. H. SVENSSON
MACHINE FOR THE MANUFACTURE OF NUTS
Filed Feb. 7, 1921　　　2 Sheets-Sheet 1

Fig. 1.

Inventor
S. H. Svensson
By Marks & Clerk
Attys.

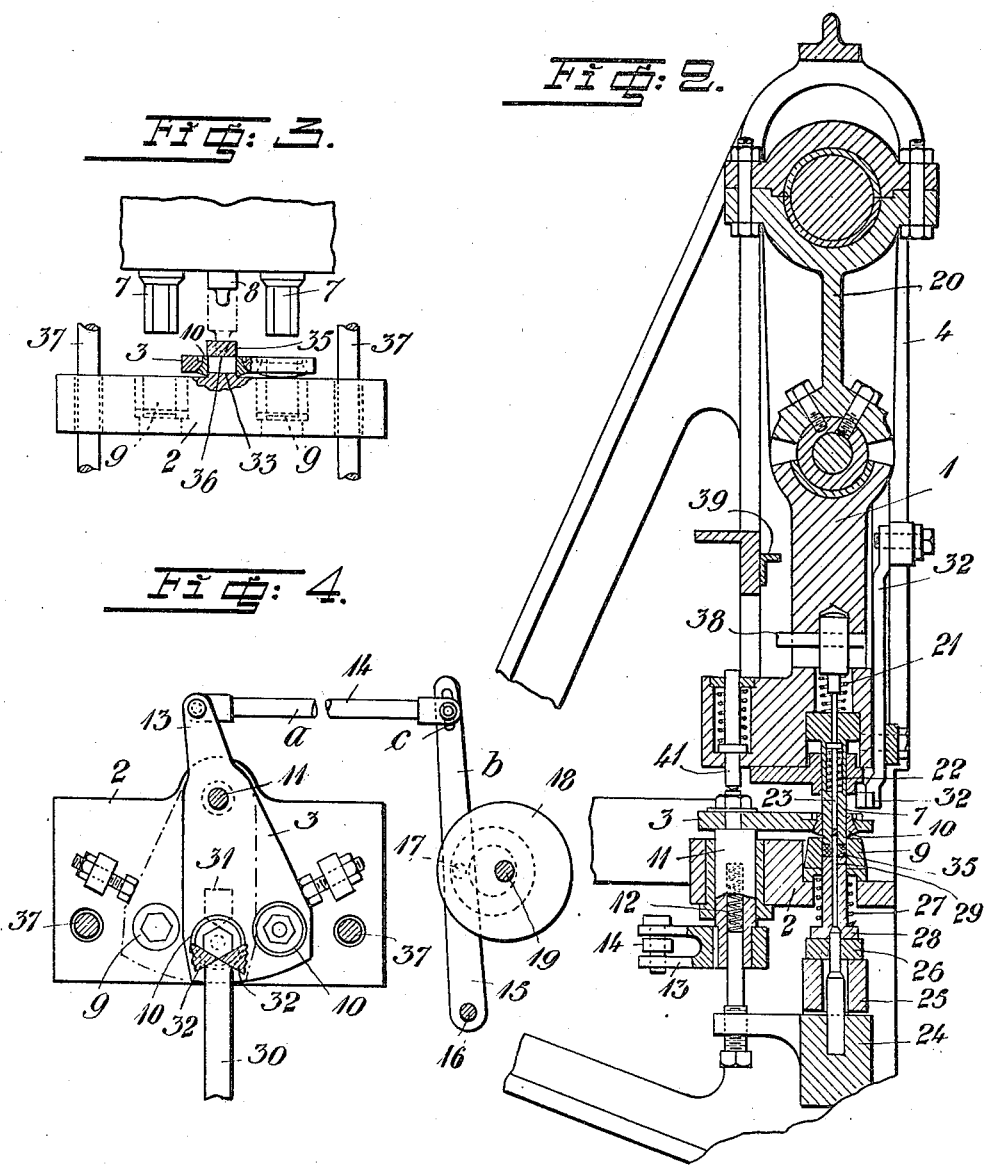

Patented Sept. 18, 1923.

1,468,046

UNITED STATES PATENT OFFICE.

SVENNING HILMER SVENSSON, OF BOFORS, SWEDEN, ASSIGNOR TO AKTIEBOLAGET BOFORS, OF BOFORS, SWEDEN.

MACHINE FOR THE MANUFACTURING OF NUTS.

Application filed February 7, 1921. Serial No. 443,099.

*To all whom it may concern:*

Be it known that I, SVENNING HILMER SVENSSON, engineer, a subject of the King of Sweden, residing at Bofors, Sweden, have invented certain new and useful Improvement in Machines for the Manufacturing of Nuts, of which the following is a specification.

The present invention relates to a machine for the manufacturing of nuts and has for its object the provision of a machine for manufacturing nuts in an effective manner, and one wherein a minimum amount of wear is occasioned on the operating parts.

An embodiment of the machine according to the invention is illustrated in the accompanying drawing, in which:

Fig. 1 is a front view of the machine,

Fig. 2 a vertical section thereof on the line 2—2 of Fig. 1,

Fig. 3 is an enlarged side elevational detail, and

Fig. 4 is an enlarged top plan detail.

The tools are carried partly by a vertically movable pressing head 1, partly by a fixed table 2 and partly by a disk 3, which is movable horizontally immediately above the said table, the head, table and disk, of course, being suitably arranged in a main support.

The pressing head is guided during its movement in the vertical guides 4 and is reciprocated vertically from a driving shaft 5 by suitable means such as a crank 6 and a connecting rod 20.

The pressing head carries at its lower end two pressing stamps 7, arranged in spaced relation and laterally of each other, and an impresser 8 the latter being arranged between the stamps. Finishing die sleeves 9 are inserted in the table directly below each of the pressing stamps 7 and are spaced from each other for a distance equal to the distance between the two pressing stamps 7.

Preshaping sleeves 10 are now provided and are insertable in and movable with the disk 3. The centers of these sleeves 10 are spaced from each other for a distance equal to one-half of the distance between the centers of the finishing die sleeves 9 and such distance is equal to the distance between the center of one of the pressing stamps 7 and the center of the impresser 8.

The disk 3 is attached horizontally to a vertical shaft 11 which is journalled in the table 2 and yieldingly supported by a spring 12 arranged within the shaft in a manner to press the shaft and also the disk 3 upwardly.

The shaft 11 is provided with a rearwardly projecting arm 13, Figs. 2, 4, and connected by means of a rod 14 to the one end of a lever 15, the other end of which lever is pivotally secured to the frame at 16. This lever 15 is provided with a projection or roller 17, which engages a cam groove in a cam disk 18, the latter in turn being attached to the lower end of a vertical shaft 19, Fig. 1. The shaft 19 is preferably connected with the main shaft 5 by means of intermeshing bevel gears 20'. The disk 3 is oscillated horizontally from the main shaft by means of the arrangement just described for a purpose that will presently appear.

The pressing stamps 7 are tubular and contain plungers 23, springs 21 and 22 actuate the plungers and act to eject the central punched out portions of the nut blanks from the stamps. Center punches 29 are now provided and are attached to the frame at 24 and project upwardly therefrom and respectively through the following parts; a vertically movable catcher 25, disks 26 resting thereon, crown stamps 28 resting on the disks 26 and actuated by springs 27, and finally the finishing die sleeves 9. Each center punch 29 is preferably made of two parts resting on each other as shown in the drawing.

The bar of iron from which the nuts are produced, is shown in Fig. 4 and indicated by the numeral 30. The bar is fed above the oscillating disk 3 against a feedstop 31 located in such a way that the nut blank to be cut off, comes directly below the impresser 8 and directly above one of the preshaping sleeves 10 on the disk 3. Two knives 32 with 60° cutting edges one on each side of the bar and suitably arranged and driven in a known manner, cut off a hexagonal shaped nut blank from the bar. Subsequent to this cutting action the pressing head continues its downward movement and the impresser forces the blank into the preshaping sleeve and simultaneously impresses a round central cavity in the blank at the completion of the downward movement. A projection 33 which is attached to the table 2 projects into the preshaping sleeve 10 and serves as a bottom in the said sleeve, so that the blank at the operation of the impresser can not be forced down to the lower edge of the disk 3.

Simultaneously with the operation of the impresser or center punch 8 upon the nut blank that has just been cut off from the iron bar the pressing stamp 7 moves downwardly into the other preshaping sleeve 10 on the disk, which sleeve contains a nut blank which has been impressed centrally in a preceding operation. Hereby this nut blank is pressed down into the underlying finishing sleeve 9 (see Fig. 2) whereby the fixed corresponding center punch 29 which projects upwardly into the last named sleeve completes the perforating operation and punches out the bottom 34 in the center of the nut blank 35 which has been left back by the impresser 8 in the preshaping operation.

Finally that surface of the nut blank which faces downwardly is pressed against the crown punch 28 which thus forms or stamps the crown of the nut.

During the following upward movement of the pressing head the pressing stamps 7 and the impresser 8 are again moved to the starting position above the disk 3. As soon as the lower surfaces of the stamps during this movement have reached their starting positions above the upper edge of the disk 3, the disk is swung by means of the above described device 13—20 to its other end position, so that the previously emptied preshaping sleeve 10 is positioned below the impresser 8, and the preshaping sleeve provided with a centrally impressed nut blank comes directly below the other pressing stamp 7 and thus also directly above the corresponding finishing die sleeve.

Near the end of the upward movement of the pressing head the crown stamp 28 is lifted against the action of the spring 27, so that the completed nut in the first finishing die sleeve is ejected from this latter and is deflected laterally, so that it will fall downwardly into a receptacle or the like (not shown). The lifting of the crown stamp 28 is effected by means of the heads 36 on two screw bolts or rods 37, which are attached to the pressing head 1 and extend through vertical holes in the table 2, these heads engaging at the end of the upward movement of the pressing head the underside of the catcher 25 carrying the crown stamps 28.

As shown in Fig. 4 the centers of these rods 37 lie in alignment with an imaginary straight line drawn between the centers of the finishing die sleeves.

During the initial upward movement of the pressing head just before the pressing stamp 7 leaves the preshaping sleeve, a shoulder 38 on the plunger 23 engages a shoulder 39 on the frame whereby the upward movement of the plunger is interrupted, while the pressing stamp 7 continues its upward movement. Consequently the springs 22 are pressed together on the central part of the nut blank previously punched out by the center punch and pressed upwardly into the preshaping sleeve, is ejected.

As soon as the pressing stamps of the pressing head, during the upward movement have left the disk and before the disk is swung, the disk is pressed by the spring 12 upwardly to such an extent, that the preshaping sleeve located below the impresser 8 is disengaged from the projection 33 on the upper side of the table.

When the pressing head again moves downwardly the operation described above is repeated, but then the other punching and finishing tool, which remained idle during the preceding operation, acts upon the nut blank having been impressed centrally during said operation, and a new nut blank is impressed centrally in the other preshaping sleeve etc.

During the operation of one tool the other tool may effectively be cooled, before it again effects its punching and finishing action.

The link 14 is adjustably connected with the lever 15 for the purpose of varying the size of the stroke of the disk.

In order to press the disk 3 downwardly against the action of the spring 12 during the downward movement of the pressing head, and cause the projection 33 on the upper side of the table to engage the preshaping sleeve 10 located below the center point a yielding piston 41 is arranged on the pressing head.

Having thus fully described the invention what is claimed and desired to be secured by Letters Patent is:—

1. A machine for manufacturing nut blanks consisting of two rough-shaping sleeves, two finishing sleeves, means for impressing each nut centrally, simultaneously as it is rough-shaped, at a point located between the two finishing sleeves, and means for moving the nut blanks after such impressing and rough-shaping alternately to the one or the other of said finishing sleeves.

2. A machine for manufacturing nut blanks consisting of two rough-shaping sleeves, two finishing sleeves, means for pressing the blanks into said sleeves, means for making a central bore in the blanks, the rough-shaping sleeves and the finishing sleeves being movable with relation to each other in a plane transversely to the axis of the sleeves.

3. A machine for manufacturing nut blanks consisting of two rough-shaping sleeves arranged laterally of each other in the same plane, two finishing sleeves arranged laterally of each other and in a plane parallel to the plane of the rough-shaping sleeves, two pressing punches arranged laterally of each other opposite to the finishing sleeves, a stationary frame for supporting one pair of said sleeves, a transversely movable frame for supporting the other pair of sleeves and a member for making a central bore in the blank, located between the stationary sleeves.

4. A machine for manufacturing nut blanks consisting of two rough-shaping sleeves arranged laterally of each other in the same plane, two finishing sleeves arranged laterally of each other and in a plane parallel to the plane of the rough-shaping sleeves, two pressing punches arranged laterally of each other opposite to the finishing sleeves, a stationary frame for supporting one pair of said sleeves, a transversely movable frame for supporting the other pair of sleeves, means for impressing each blank centrally on the one side, and means for cutting away the central part of the blank.

5. A machine for manufacturing blank nuts including an oscillating frame, two preshaping sleeves arranged laterally of each other and mounted upon said frame, two finishing die sleeves placed laterally of each other and below said preshaping sleeves, one preshaping sleeve, in one end position of the frame being positioned directly opposite one of the finishing sleeves, the other preshaping sleeve at the same time being positioned at a point between the two finishing sleeves, while in the other end position of the frame the other preshaping sleeve is positioned directly opposite the other finishing sleeve simultaneously as the first preshaping sleeve is located between said finishing sleeves.

6. A machine for manufacturing blank nuts including an oscillating frame, two preshaping sleeves arranged laterally of each other and mounted upon said frame, two finishing die sleeves placed laterally of each other, one preshaping sleeve, in one end position of the movable frame being positioned directly opposite one of the finishing sleeves, the other preshaping sleeve at the same time being positioned at a point between the two finishing sleeves, while in the other end position of the movable frame the last mentioned preshaping sleeve is positioned directly opposite the second mentioned finishing sleeve simultaneously as the first mentioned preshaping sleeve is located between said finishing sleeves, a pressing head, two pressing punches on the head and located directly opposite the said finishing sleeves, and an impresser also carried by said pressing head and located between said pressing punches.

7. A machine for manufacturing blank nuts comprising an oscillating frame movable into two positions, two preshaping sleeves mounted upon said frame laterally of and in spaced relation to each other, two finishing die sleeves spaced laterally of each other, one preshaping sleeve, in the one end position of the frame, being positioned directly opposite one of the finishing sleeves, the other preshaping sleeve at the same time being positioned at a point between the two finishing sleeves, while in the other end position of the movable frame the last mentioned preshaping sleeve is positioned directly opposite the other finishing sleeve simultaneously as the first mentioned preshaping sleeve is located between said finishing sleeves and means for oscillating the frame between said positions.

8. A machine for manufacturing blank nuts comprising an oscillating frame movable into two positions, two preshaping sleeves spaced laterally of each other and mounted upon said frame, two finishing die sleeves spaced laterally of each other, one preshaping sleeve in the one end position of the movable frame being positioned right directly opposite one of the finishing sleeves, the other preshaping sleeve at the same time being positioned at a point between the two finishing sleeves, while in the other end position of the movable frame the last mentioned preshaping sleeve is positioned right directly oposite the other finishing sleeve simultaneously as the first preshaping sleeve is located at the point between the finishing sleeves, a movable pressing head, two pressing punches on the head and located directly opposite the said finishing sleeves, an impresser also carried by said pressing head and loacted directly between the said pressing punches, means for reciprocating the head, and means for guiding the head.

9. A machine for manufacturing blank nuts comprising an oscillatory frame movable into two end positions, two preshaping sleeves spaced laterally of each other and mounted upon said frame, two finishing die sleeves spaced laterally of each other, one preshaping sleeve, in the one end position of the movable frame, being positioned directly oposite one finishing sleeve, the other preshaping sleeve at the same time being positioned at a point between the two finishing sleeves, while in the other end position of the movable frame the last mentioned preshaping sleeve is positioned directly opposite the other finishing sleeve simultaneously as the first preshaping sleeve is located at the point between the finishing sleeves, a crown punch projecting into the finishing sleeve from a side which is remote from the preshaping sleeve and means for pressing the blank against said crown punch.

10. A machine for manufacturing blank nuts comprising a horizontally disposed frame movable into two positions, two preshaping sleeves spaced laterally of each other and arranged upon said frame, two finishing die sleeves spaced laterally of each other, one preshaping sleeve, in one end position of the movable frame, being positioned directly opposite one of the finishing sleeves, the other preshaping sleeve being positioned simultaneously at a point between the two finishing sleeves, while in the other end position of the movable frame the last mentioned preshaping sleeve is positioned directly opposite the other finishing sleeve simultaneously as the first preshaping sleeve is located at the point between the finishing sleeves, crown punches projecting into the finishing sleeves from below and means for synchronously pressing the blanks downwardly against said crown punches, a vertically movable part for carrying said crown punches and means for lifting said part at the end of the upward movement of the pressing means.

11. A machine for manufacturing blank nuts comprising a horizontally disposed frame movable into two end positions, two preshaping sleeves spaced laterally of each other and arranged upon said frame, two finishing die sleeves spaced laterally of each other and arranged immediately below said preshaping sleeves, one preshaping sleeve, in the one end position of the movable frame, being positioned directly opposite one of the finishing sleeves, the other preshaping sleeve being positioned simultaneously at a point between the two finishing sleeves, while in the other end position of the movable frame the last mentioned preshaping sleeve is positioned directly opposite the other finishing sleeve simultaneously as the first preshaping sleeve is located at the point between the finishing sleeves, tubular crown punches projecting into the finishing sleeves from below, means for synchronously pressing the blanks downwardly against said crown punches, and fixed punches extending through the crown punches for completely perforating the nut blank when the pressing means forces the nut blank downwardly into the corresponding finishing sleeve.

In testimony whereof I affix my signature in presence of two witnesses.

SVENNING HILMER SVENSSON.

Witnesses:
UNO PETTERSON,
N. E. PETTERSON.